United States Patent [19]
Davis et al.

[11] 3,883,581
[45] May 13, 1975

[54] PREPARATION OF BROMINATED PENTAERYTHRITOLS AND ESTERS UTILIZING CERTAIN DIBASIC ACIDS

[75] Inventors: Ralph A. Davis, Midland; Ronald G. Tigner, Coleman; R. Garth Pews, Midland; Jurgen H. Exner, Midland; Carl L. Gibbons, Midland, all of Mich.

[73] Assignee: The Dow Chemical Company, Midland, Mich.

[22] Filed: May 23, 1973

[21] Appl. No.: 363,203

[52] U.S. Cl. ...... 260/485 G; 260/45.85; 260/45.95; 260/485 H; 260/633
[51] Int. Cl. ..................... C07c 69/44; C07c 69/60
[58] Field of Search............ 260/485 G, 633, 485 H

[56] References Cited
UNITED STATES PATENTS
3,118,003   1/1964   Seefelder et al. .................. 260/633

*Primary Examiner*—Lorraine A. Weinberger
*Assistant Examiner*—E. Jane Skelly
*Attorney, Agent, or Firm*—Sidney J. Walker; Ralph M. Mellom

[57] ABSTRACT

Brominated pentaerythritols and esters, and useful mixtures of same, are prepared utilizing certain aliphatic saturated dicarboxylic acids or their anhydrides having from 3 to 10 carbon atoms in the molecule or certain aliphatic monoethylenically unsaturated dicarboxylic acids or their anhydrides having from 4 to 5 carbon atoms in the molecule where pentaerythritol is contacted with HBr and the dicarboxylic acids in the liquid phase under conditions where bromine and the carboxyls of the acids replace the hydroxyls of the pentaerythritol.

9 Claims, No Drawings

PREPARATION OF BROMINATED PENTAERYTHRITOLS AND ESTERS UTILIZING CERTAIN DIBASIC ACIDS

BACKGROUND OF THE INVENTION

The preparation of brominated pentaerythritols has been carried out by reacting pentaerythritol with HBr in the liquid phase under conditions where bromine replaces the hydroxyls of the pentaerythritol wherein the reaction is carried out by conducting it in a solvent in the presence of a monocarboxylic acid such as acetic acid. Where lower levels of acetic acid have been used, tetrabromoneopentane has been formed in small amounts, creating an undesirable musty odor which can impair the market acceptance of certain end products. This odor is particularly objectionable where the product is intended for use as a reactive fire retardant for urethane foam. Removal of this tetrabromoneopentane from the end product is difficult. Where higher acetic acid catalyst levels have been employed, a new problem is created where the end use of the product is a fire retardant for urethane foams.

The high surface area of foamed polyurethane and especially the open cell nature of flexible foams present the opportunity for any volatile or dissolved materials in the foam to escape. Many of the additive-type flame retardants suffer a low degree of permanence in flexible foam due to losses by leaching, volatilization or migration caused by temperature and pressure gradients. Besides a loss of fire retardance that occurs, a problem called "fogging" occurs when fire retardants (or other components) are volatilized from automobile interior materials. This is caused by condensation of the volatiles on the interior window surfaces giving a hazy film. Thus, the use of reactive fire retardants which become a part of the polymer structure is desirable as they have the potential of complete permanence and no fogging problems.

Elimination of the odor problem with the use of high catalyst levels of acetic acid increases the amount of tribromoneopentyl acetate formed. Tribromoneopentyl acetate is inert to the polyurethane forming reactions. Moreover, the compound is fairly volatile and is lost on aging of foams, and worse, can cause fogging problems as the direct result of volatilization. The compound can be removed by various means but as this removes bromine it cuts down the fire retardancy and further requires additional process steps. These significant drawbacks to the preparation of brominated pentaerythritols for use in certain applications have led to an extensive search for other means to avoid these problems.

SUMMARY OF THE INVENTION

It has now been discovered according to the present invention that useful brominated compounds selected from the group consisting of brominated pentaerythritols, brominated neopentyl esters and mixtures thereof, may be prepared by reacting pentaerythritol in the liquid phase with HBr and a dibasic acid selected from the group consisting of an aliphatic, saturated dicarboxylic acid or anhydride having from 3 to 10 carbon atoms in the molecule and an aliphatic monoethylenically unsaturated dicarboxylic acid or anhydride having from 4 to 5 carbon atoms in the molecule, in an inert solvent, under conditions where bromine replaces some of the hydroxyls of the pentaerythritol at the same time that a controlled amount of esterification is taking place as a result of the reaction between the pentaerythritol and the dibasic acid. pentaerythritol, as used herein, includes pentaerythritol that has been partially halogen-substituted.

The products of the invention are brominated pentaerythritols where 1 to 3 of the hydroxyls have been replaced by bromine, brominated neopentyl esters of the dicarboxylic acids, and mixtures of the brominated pentaerythritols and the neopentyl esters. Optionally, the products of the invention may contain some chlorine provided that the starting pentaerythritol is a chlorinated derivative. Preferred products, however, contain only bromine as the halogen atom.

A special advantage of the process of the present invention is that essentially any product distribution of brominated pentaerythritols, i.e., the mono-, di- or tribromopentaerythritols and brominated neopentyl esters can be obtained. As used herein, monobromopentaerythritol designates pentaerythritol where one hydroxyl has been replaced by bromine, dibromoneopentyl glycol designates pentaerythritol where two hydroxyls are replaced by bromine and tribromoneopentyl alcohol is pentaerythritol where three hydroxyls are replaced by bromine. Brominated pentaerythritols as used herein refer to any one or combination of these three compounds and where the starting pentaerythritol is a chlorinated derivative, the term also covers di-halogen-substituted pentaerythritols. Thus, for example, the term "brominated pentaerythritol" would include monochloro-dibromoneopentyl alcohol.

As used herein, brominated neopentyl esters include, among others, the bis(tribromoneopentyl) esters, the bis(dibromoneopentyl glycol) esters, mixtures of these in combination with each other and the other variant brominated esters that may be formed. Table I, below, gives examples of some of the neopentyl esters that are formed in accordance with the process of this invention.

The products of this invention are useful fire retardants in a number of plastics, including polyesters and urethane foams. The end products may be separated and used in their purified form or they may be advantageously used as mixtures with great effect. It is to be understood that the products of the process of this invention will initially be mixtures of brominated pentaerythritols, brominated neopentyl esters and, in some cases, brominated hybrids containing unreacted hydroxyls and ester groups, but in all cases, these mixtures are efficacious fire retardants.

In this method of preparing brominated pentaerythritols and brominated neopentyl esters, the primary and essential feature of the invention is conducting the reaction in a solvent medium containing HBr and aliphatic saturated dicarboxylic acids or their anhydrides having 3 to 10 carbon atoms in the molecule or aliphatic monoethylenically unsaturated dicarboxylic acids or their anhydrides having from 4 to 5 carbon atoms in the molecule. In the practice of the present invention, the dicarboxylic acid concentration is from about 0.2 mole percent to about 50 mole percent of the pentaerythritol charged depending on what predominant product is desired.

The aliphatic, saturated dicarboxylic acids useful in the present invention are preferably those aliphatic dicarboxylic acids or halogenated aliphatic dicarboxylic acids of 3 to 10 carbon atoms and their anhydrides. Of special interest is adipic acid because of its low cost and desirable effectiveness. Of the aliphatic dicarboxylic acids that are unsaturated and suitable for use in the present invention are maleic, fumaric, itaconic and citraconic acids and their anhydrides along with halogenated derivatives of the same.

As indicated above, the advantageous features of the present invention include the tailoring of the end product depending on the concentrations of the dicarboxylic acid and the HBr. As will be shown below, the concentration and amount of HBr determines whether the product will be predominantly a mono-, a di- or a tribrominated neopentyl entity while the concentration of the dicarboxylic acid will determine whether the product will be predominantly a brominated pentaerythritol or a brominated neopentyl ester.

Looking at the HBr function in this regard, usually a stoichiometric excess of HBr based on the desired product is employed to assure completion of the reaction, with an excess of from about 10 to about 50 percent being sufficient to obtain the desired product in predominant yield. However, the ratio of the brominated pentaerythritols, i.e., mono- to di- to tri-, is substantially affected by the concentration of the dicarboxylic acid. As a result, the amount of acid in the reaction medium provides a convenient variable to control the reaction to obtain the desired product. Thus, where the predominant product desired is dibromoneopentyl glycol, preferred dicarboxylic acid concentrations are from about 1 to about 4 mole percent of the pentaerythritol charged while where the predominant product desired is tribromoneopentyl alcohol, preferred acid concentrations are from about 4 to about 7 mole percent of the pentaerythritol charged. Where the prominent products desired are the brominated neopentyl esters, the preferred dicarboxylic acid concentrations are from about 25 to about 50 mole percent of the pentaerythritol charged.

Some of the brominated neopentyl esters that are predominantly formed are shown in Table I, below. By way of example only, these products are represented as the esters of adipic acid; however, "brominated neopentyl esters," as used herein, include all the esters formed by the process of this invention, including those brominated pentaerythritol products containing unreacted hydroxyl groups.

TABLE I

| Product Designation | Formula | Molecular Weight |
|---|---|---|
| (I) | $HOC(CH_2)_4COCH_2C(CH_2Br)_3$ (with C=O groups) | 456 |
| (II) | $(CH_2Br)_3CCH_2OC(CH_2)_4COCH_2C(CH_2Br)_3$ | 760 |
| (III) | $(CH_2Br)_3CCH_2OC(CH_2)_4COCH_2C(CH_2OH)(CH_2Br)_2$ | 697 |
| (IV) | $(HOH_2C)(CH_2Br)_2CCH_2OC(CH_2)_4COCH_2C(CH_2OH)(CH_2Br)_2$ | 634 |
| (V) | $HOC(CH_2)_4COCH_2C(CH_2OH)(CH_2Br)_2$ | 590 |
| (VI) | $(HOH_2C)(CH_2Br)_2CCH_2OC(CH_2)_4COCH_2C(CH_2Br)_2CH_2OC(CH_2)_4COCH_2C(CH_2OH)(CH_2Br)_2$ | 1006 |
| (VII) | $(CH_2Br)_3CCH_2OC(CH_2)_4COCH_2C(CH_2Br)_2CH_2OC(CH_2)_4COCH_2C(CH_2OH)(CH_2Br)_2$ | 1069 |
| (VIII) | $(CH_2OH)_2(CH_2Br)CCH_2OC(CH_2)_4COCH_2C(CH_2OH)(CH_2Br)_2$ | 571 |
| (IX) | $(CH_2OH)_2(CH_2Br)CCH_2OC(CH_2)_4COH$ | 327 |

By way of examples, where low concentrations of the dicarboxylic acid (up to about 10 percent) are used in the process of the invention and the tribromoneopentyl alcohol is the desired product, the dicarboxylic acid remaining in the product will be mainly (80%+) in the form of the neopentyl esters (II), Table I. Most of the remaining ester formed will be (I) with traces of some of the others listed being present.

If dibromoneopentyl glycol is to be the principal product at the low dicarboxylic acid concentrations, i.e., where the brominated pentaerythritol moiety is about 80% dibrom, 8% mono-brom and 12% tri-brom, then structure (IV) will be the predominant ester species (about 60 to 70 percent of the total esters formed) with (III), (VIII), (V) and (IX) making up most of the balance.

The predominant products in these instances are, of course, the tribromoneopentyl alcohol in the first case and dibromoneopentyl glycol in the second. The free alcohols will make up 80 to 95 percent of the product and the dicarboxylic acid esters only 5 to 20 percent of the product.

Where the process of the invention is practiced with the dicarboxylic acid concentration on the order of 40 to 50 mole percent based on the pentaerythritol charged, and enough HBr is used to produce the tribromoneopentyl moiety, then the total product will consist essentially of esters of which (II) will predominate (up to 80 percent) with (I), (III) and (IV) providing most of the balance. A small amount of the telomer represented as (VII) might also be expected.

If at the same concentration of dicarboxylic acid, HBr is added to produce essentially the dibromoneopentyl moiety, the predominant product will be the telomer (VI) and the balance would consist of (V), (III), (IX), (VII) and telomers which would be a combination of (IX) and (VI).

In these cases, only small amounts of the brominated alcohols would be found (5 to 10 percent) in the final product with the remainder consisting of the esters indicated above.

Finally, where the intermediate concentration of the dicarboxylic acid is used in the process of the present invention (from about 25 to about 30 mole percent of the pentaerythritol charged) then 50 to 60 percent of the product will consist of the esters found when the higher concentrations of the dicarboxylic acid (40 to 50 percent) is used and will vary in the same manner with the amount of HBr used. However, 40 to 50 percent of the product will now be the tribromoneopentyl alcohol or the dibromoneopentyl glycol or a mixture of both depending on the HBr fed to the reaction.

Interpolation and extrapolation of this data can produce a variety of end products suitable for many used as all of the compounds prepared, individually and/or collectively are effective fire retardants.

Although the use of the named dicarboxylic acids is the focal point of the present invention, the presence of an inert solvent is also important. The reaction of anhydrous HBr and the dicarboxylic acid with pentaerythritol in the absence of a solvent produces a black resinous mass and only small amounts of the desired product. Consequently, the presence of an inert solvent is important.

Even though the presence of a solvent is essential, the nature of the solvent does not appear to be critical except that the solvent should not substantially react with the pentaerythritol, HBr or the dibasic acid under the conditions employed in the process. Also, where the mole ratio of the dibasic acid is from about 20 to about 25 percent of the pentaerythritol charged, and the dibasic acid is in the anhydride or acid halide form, undue polymerization may take place if conditions are not controlled. Such conditions are obviated by the preferential use of water as the solvent in this acid range. Representative examples of preferred solvents include: water, saturated hydrocarbon solvents such as benzene, toluene, xylene, cyclohexane, petroleum ether and heptane; and halogenated hydrocarbon solvents such as perchloroethylene, trichloroethylene, chlorobenzene, dichlorobenzene, hexachlorocyclopentadiene, ethylene dibromide, methylene chloride and methylene dibromide.

With respect to the other properties of the solvent, those which provide a reaction mixture having a reflux temperature within the desired reaction temperatures are preferred. Of greatest interest because of their effectiveness and low cost are perchloroethylene and water. Of course, any of the solvents may be used alone or in combination with each other.

The reaction is broadly carried out by techniques and conditions of the art, and these parameters are not the subject of the present invention. Even though these techniques are known, some of the factors merit attention because their adoption could lead to the best results using the invention.

The temperature of the reaction may vary widely so long as the halogen replacement occurs. In the preferred practice of the invention it has been found that reaction temperatures of from about 85° to about 140°C. are desirably employed, with temperatures of from about 90° to about 130°C. being preferred because of the particularly good reaction and product obtained.

Normally the reaction is run at atmospheric or superatmospheric pressure. Although this variable is not critical, superatmospheric pressure is preferred. Thus, the reaction may be run at from about atmospheric pressure to about 75 psig or greater with a preferred pressure range of from about 5 to about 20 psig. The reaction time, of course, depends on the many factors in the invention, but in normal practice, the reaction is conveniently carried out in from about 1 to about 20 hours with a preferred reaction time range of from about 2 to about 12 hours.

Several interesting aspects of the use of the acids of the present invention should be mentioned. The brominated esters formed have low volatility. Activity is approximately equal (on a carboxyl equivalent basis) to that of acetic acid.

Another unusual observation is that oxalic acid will not function as a catalyst in the present invention while malonic acid performs well in 62% HBr but is somewhat less effective when perchloroethylene solvent is used.

SPECIFIC EMBODIMENTS

EXAMPLE 1

Preparation of Dibromoneopentyl Glycol

Using a 50-gallon glass-lined reactor equipped with a stirrer, a 4-inch by 10-foot glass column (no packing), a 13 ft.$^2$ condenser, a 10-gallon glass-lined receiver and a 2-stage jet for vacuum, 80 pounds of perchloroethylene, 1 ½ pounds of adipic acid and 115 pounds of pentaerythritol were charged to the reactor in that order. The temperature was raised to 110°C. and 172 pounds of anhydrous HBr was fed into the reactor at the maximum rate while holding the temperature at 110° to 117°C. and pressure at 5 to 20 psig.

The HBr was added continuously in 3 hours and 15 minutes while holding the temperature at 110° to 117°C. and the reaction mixture held while stirring for an additional 50 minutes at the same temperatures.

The HBr, water and perchloroethylene were then stripped off at 110° to 105°C. at 25 mm. Hg pressure. After stripping, the reactor was blanketed with nitrogen and sampled. 2,2-Bis(bromomethyl) oxetane (300 ml.) was added to neutralize the remaining acid and the product allowed to stir for 20 minutes at 100°C.

The product was then added to a flaker and 214 pounds of white flaked product having the following analysis were recovered: monobromopentaerythritol — 4.0 weight percent; dibromoneopentyl glycol — 82.0 weight percent; and tribromoneopentyl alcohol — 13.9 weight percent. This analysis was exclusive of the adipate esters which comprised about 2.5 weight percent of the total product.

Product recovery and reaction rate compared favorably to those obtained when acetic acid was used as the catalyst for the preparation of dibromoneopentyl glycol.

EXAMPLE 2

Preparation of Tribromoneopentyl Alcohol

Employing the same equipment and procedure as in Example 1, above, 60 pounds of perchloroethylene, 6 pounds of adipic acid and 115 pounds of pentaerythritol were charged to the reactor and 254 pounds of anhydrous HBr fed into the reactor continuously over the entire reaction time at the maximum rate. The reaction time was 14 hours and 25 minutes at temperatures of between 100° and 113°C. utilizing pressures of 15 to 18 psig. After stripping off water, HBr and perchloroethylene, the residual HBr was neutralized and 186 pounds of white flaked product was recovered having the following analysis: dibromoneopentyl glycol — 1.8 weight percent; tribromoneopentyl alcohol — 97.9 weight percent; and tetrabromoneopentane — 0.3 weight percent. This small amount of tetrabromoneopentane is within the acceptable odor limits. The somewhat longer reaction time and the lower than expected yield were due to a blown frangible early in the run. However, the product was found to be very satisfactory as a fire retardant component in a polyurethane foam.

EXAMPLE 3

Effectiveness of Various Dibasic Acids as Catalysts

Identical laboratory runs were made to determine the effectiveness of various dibasic acids. All runs were made in a 2-liter flask equipped with a stirrer and a condenser followed by a water scrubber to absorb any unreacted HBr that passed through the system. In each case the reactor was charged as follows:

pentaerythritol — 272 g.
perchloroethylene — 100 ml.
dibasic acid — 6.0 mole % based on the pentaerythritol
anhydrous HBr — 428 g.

Anhydrous HBr was weighed and metered into the reaction continuously with stirring and heating at such rates as to minimize any loss to the final scrubber. A small flow of nitrogen was used in this system at all times to prevent any air from entering the reaction which would result in oxidation and color formation.

After the HBr addition had been completed, the HBr, water and perchloroethylene were stripped off under 25 mm. of vacuum at about 110°C. The residual HBr was neutralized and the product analyzed by G.L.C. The results of these runs are given in Table II.

TABLE II

| | | | Perchloroethylene Solvent | | | | | |
| | | | | | Product Composition on Wt. %* | | | Moles |
| Catalyst | Wt. % | Mole % | Reaction Temp. | Reaction Time | Penta-erythritol | Mono-Brom | Di-Brom | Tri-Brom | Hbr Lost to Scrubber |
| --- | --- | --- | --- | --- | --- | --- | --- | --- | --- |
| Adipic Acid | 6.5 | 6.0 | 112°–115°C. | 7 hours 20 min. | | 13.5 | 76.7 | 9.7 | 0.3 M |
| Glutaric Acid | 5.8 | 6.0 | 109°–113°C. | 6 hours 50 min. | | 23.9 | 70.9 | 5.2 | 0.55 M |
| Succinic Acid | 5.2 | 6.0 | 110°–114°C. | 7 hours 15 min. | | 30.6 | 65.1 | 4.3 | 0.3 M |
| Malonic Acid | 4.6 | 6.0 | 110°–115°C. | 7 hours 35 min. | 1.2 | 58.6 | 38.2 | 1.9 | 0.9 M |
| Oxalic Acid | 4.0 | 6.0 | 101°–116°C. | 7 hours 17 min. | 42.1 | 56.7 | 1.2 | .0 | 2.42 M |
| Suberic Acid | 7.7 | 6.0 | 102°–114°C. | 7 hours 50 min. | | 28.6 | 68.7 | 2.7 | 0.15 M |
| Sebacic Acid | 9.0 | 6.0 | 109°–113°C. | 5 hours 50 min. | | 15.0 | 75.5 | 9.5 | 0.37 M |

* Not including esters

As can be seen from the above table, oxalic acid was not effective as a catalyst for the reaction while malonic acid was somewhat less effective than the remaining dibasic acids shown.

EXAMPLE 4

Preparation of Brominated Pentaerythritols Using Aqueous HBr as Solvent

The equipment and operating conditions for these runs were the same as in Example 3, above, except that the solvent used was aqueous HBr (62%) instead of perchloroethylene. Additionally, maleic acid was used and found to be excellent catalyst and malonic acid was considerably more effective in this solvent. Once again, oxalic acid was shown not to be an effective catalyst.

In each case the reactor was charged as follows:
pentaerythritol — 272 g.
62% HBr — 100 ml.
dibasic acid — 6.0 mole % based on the pentaerythritol charged
anhydrous HBr — 428 g.

The product was worked up as in Example 3 and analyzed by G.L.C. The results of these runs are given in Table III.

product of Example 5. This was reacted with 342 g. of toluene diisocyanate (80/20 toluene diisocyanate. Index = 105).

The finished foam had a density of 1.69 pounds per cubic foot and was soft and flexible. All specimens of this foam passed the Motor Vehicle Safety Standard Test (MVSS-302), which is the flammability test required by the Department of Transportation. All specimens were self-extinguishing in less than two inches from the first gauge mark.

Example 6 product (6 pph) was blended into a polyurethane foam that had the same formulation as that

TABLE III

| | | | | | 65% HBr as Solvent | | | | |
| | | | | | Product Composition on Wt. %* | | | | Moles |
| Catalyst | Wt. % | Mole % | Reaction Temp. | Reaction Time | Penta-erythritol | Mono-Brom | Di-Brom | Tri-Brom | HBr Lost to Scrubber |
| --- | --- | --- | --- | --- | --- | --- | --- | --- | --- |
| Adipic Acid | 6.5 | 6.0 | 95°–122°C. | 1 hour 7 min. | | 3.1 | 77.0 | 19.9 | 0.24 M |
| Sebacic Acid | 8.9 | 6.0 | 95°–129°C. | 1 hour 20 min. | | 5.0 | 75.2 | 19.8 | 0.05 M |
| Malonic Acid | 4.6 | 6.0 | 95°–117°C. | 4 hours 10 min. | 0.1 | 14.3 | 74.1 | 11.4 | 0.37 M |
| Oxalic Acid | 4.0 | 6.0 | 103°–116°C. | 6 hours 35 min. | 1.9 | 49.2 | 44.5 | 4.3 | 1.39 M |
| Maleic Acid | 5.2 | 6.0 | 100°–116°C. | 4 hours 10 min. | | 11.8 | 75.1 | 13.1 | 0.17 |

* Not including esters

EXAMPLES 5 AND 6

Use of High Percentages of Adipic Acid

The equipment and operating conditions for these runs were the same as in Example 4 except the amounts of the dicarboxylic acid (adipic acid in this case) were greatly increased and the amounts of HBr varies so as to produce predominantly bis(tribromoneopentyl) adipate (Example 5) and, in Example 6, predominantly the dibromoneopentyl moiety consisting of the telomer (VI) and dibromoneopentyl glycol as the principal products. The results of the two runs are shown in Table IV, below.

containing the product of Example 5, above, except that 354 g. of toluene diisocyanate was utilized to achieve a TDI index of 105. The foam was soft, open celled and flexible with a density of 1.63 pcf. Specimens of this foam were tested using the MVSS-302 test and were found to be self-extinguishing. They did not burn past the first gauge mark.

EXAMPLES 7–10 AND COMPARATIVE EXAMPLE A

Polyurethane foams were prepared using tribromoneopentyl acetate, bis(tribromoneopentyl)adi-

TABLE IV

| | Product Data Using High Percentages of Adipic Acid | | | | |
| Example | Mole Percentage Adipic Acid | Percentage Excess HBr | Time | Hydroxyl Percentage | Acidity (mg. NaOH/g.) |
| --- | --- | --- | --- | --- | --- |
| 5 | 50% | 16.7% | 3 hr., 20 min. | 2.0 | 12.0 |
| 6 | 30% | 12.5% | 1 hr., 40 min. | 9.0 | <2 |

The 16.7 percent excess of HBr refers to the excess over the stoichiometric amount required to produce a tribromoneopentyl moiety while the 12.5% excess in Example 6 is over the amount required to produce a dibromoneopentyl moiety. The hydroxyl percentage refers to the free hydroxyls present in the final product. Six parts per hundred of the product of Example 5 was incorporated into a polyurethane foam which was made up of 700 g. polyether polyoxypropylenetriol having a molecular weight of about 3,800, 28 g. of water, 9.1 g. of a silicone oil employed as a cell control agent, 0.75 g. of Niax A-1 (bis(2-dimethyl aminoethyl) ether, a catalyst commercially available from Union Carbide), 1.3 g. of stannous octoate and 42 g. of the pate, and mixtures of tribromoneopentyl alcohol and bis(tribromoneopentyl)adipate as fire retardant agents and compared with a polyurethane foam having no fire retardant agent (Comparative A).

The formulation for these flexible foams in all cases included polyoxypropylenetriol having an average molecular weight of about 3000 (500 g.), water (19 g.), silicone oil (4 g.), Niax A-1 (0.6 g.) and stannous octoate (1 g.). Toluene diisocyanate (80% 2,4- and 20% 2,6-isomer) was used at a level of 1.05 equivalent of NCO per equivalent of hydroxyl in the formulation. (TDI index = 105.) In Examples 7–10, 50 g. of the particular fire retardant agent was blended into the formulation as follows:

TABLE V

| Example | Fire Retardant Agents | Density of Foam (lbs./cu. ft.) |
|---------|----------------------|-------------------------------|
| 7 | TBNP* Acetate (10 pph) | 1.78 |
| 8 | Bis(TBNP)Adipate | 1.8 |
| 9 | TBNP Alcohol (5 pph) and BIS(TBNP) Adipate (5 pph) | 2.05 |
| 10 | Product prepared with 5 mole percent adipic acid consisting of 90% by weight of brominated pentaerythritols (90% TBNP alcohol and 10% DBNPG** glycol and 10 weight percent of TBNP and DBNPG adipate esters (10 pph) | 1.86 |

*TBNP = tribromoneopentyl
**DBNPG = dibromoneopentyl glycol

The above foams were cured at 100°C. for 1 hour, cooled and sliced into 0.5 in. by 4 in. by 12 in. strips for fire retardant testing. Six slices of each foam were subjected to heat aging at 140°C. for 22 hours (ASTM D-1564-69 dry heat age test). The foams were then tested for flammability with comparison of results before and after the heat age test. One slice of foam before and after heat age testing was saved for bromine analysis.

Burn tests were conducted according to the MVSS-302 test.

TABLE VI

| Example | Burn Rate Before Heat Aging | Burn Rate After Heat Aging |
|---------|----------------------------|----------------------------|
| Comparative A | Consumed (16.8 in./min.* | Not tested |
| 7 | SE-NBR** | Consumed (14 in./min.)*** |
| 8 | SE-NBR | SE-NBR |
| 9 | SE-NBR | SE-NBR |
| 10 | SE-NBR | SE-NBR |

* Average of 5 samples
** Self-Extinguishing-No Burn Rate. All specimens rated SE-NBR burn 0.5 in. or less beyond the ignition source
*** Average of 4 samples The above data shows that the tribromoneopentyl acetate specimen was fire retardant before heat aging but due to volatility loss, the specimen after heat aging did not pass the test. By contrast, Examples 8 through 10 were rated SE-NBR both before and after heat aging.

Foam samples of Examples 7 through 10 were then tested for bromine analysis both before and after heat aging.

TABLE VII

| Example | Bromine Percentage Before Heat Aging | Bromine Percentage After Heat Aging |
|---------|--------------------------------------|-------------------------------------|
| 7 | 3.7 | 0.1 |
| 8 | 3.6 | 3.5 |
| 9 | 3.9 | 3.5 |
| 10 | 4.0 | 3.3 |

The data shows that the heat aging of the polyurethane foam completely volatilized the tribromoneopentyl acetate while the brominated pentaerythritols and adipates were completely retained during the heat age tests.

EXAMPLE 11

Following the procedure employed in Example 1, and using 2.5 mole percent adipic acid based on the pentaerythritol charged, a white flaked product was obtained having the following analysis: about 95% of the product consisted of brominated pentaerythritols comprising 82% dibromoneopentyl glycol, 13% tribromoneopentyl alcohol and 5% monobromopentaerythritol. The remaining 5% of the product consisted of brominated neopentyl esters of which about 60% was the neopentyl ester (IV), and the remainder consisting of principally esters (V), (III), (VIII) and (IX) in that order. This product was used to prepare an unsaturated polyester resin as follows: maleic anhydride (1.9 moles) and phthalic anhydride (1.9 moles) were charged to a five-neck resin flask equipped with a stirrer, thermowell, dry nitrogen sparge, Dean-Stark trap with a cold water condenser and a sampling port. The nitrogen sparge was started (300 ml./min.), the anhydride melted with stirring and the temperature raised to about 120°C. The brominated neopentyl product (4.0 moles) was added rapidly with continued stirring. The heating was continued until all the material in the reactor had melted and the temperature again reached 120°C. At this point the nitrogen sparge was increased to about 1,000–1,200 ml./min. The temperature was raised to about 180°C. as rapidly as possible and maintained until completion of reaction. The temperature was then reduced to 140°C. with the nitrogen and stirring continued, and hydroquinone added. Styrene having 12 ppm. tert.-butylcatechol was added slowly with agitation to give a resulting resin containing approximately 30% bromine and 30% styrene.

This resin (141 g.) was mixed with a styrenated (25 weight percent) propylene glycol resin (90 g.) and dissolved in styrene (67.5 g.) and blended with benzoyl peroxide (2 g.). The resulting mixture, containing 20 weight percent bromine and 30 weight percent styrene, was poured into a mold and cured in an air heated oven at 80°C. for 1 hour and at about 120°C. for another hour to give a finished casting. The cured casting was a clear, solid (Barcol Hardness – 48) panel which had an LOI of about 35.5 (ASTM D-2863).

COMPARATIVE EXAMPLES A AND B

To show the efficiency of the dicarboxylic acids as catalysts, Examples A and B were separately prepared in two-liter flasks equipped with a stirrer and a condenser followed by a water scrubber to adsorb any unreacted HBr that passed through the system as follows:

Example A charge was 544 g. of pentaerythritol (4 moles), 350 perchloroethylene and 907 g. anhydrous HBr. The anhydrous HBr was weighed and metered into the reaction continuously over a period of 6.7 hours at 116° to 120°C. with stirring. The HBr fed was a 40% excess over the amount required for di-brom formation. The HBr and perchloroethylene were then stripped off under vacuum to 114°C. at 15 mm. Hg. 545 g. of a white solid was recovered which turned out to be essentially pure pentaerythritol. Titration of the scrubber and distillate gave a total recovery of the HBr charged, indicating no reaction between the HBr and the pentaerythritol.

Example B charge was the same as Example A, above, except that 54 g. of H₂O was also added. The anhydrous HBr (40% excess over the stoichiometric amount needed to obtain a di-brom) was weighed and metered into the reaction over a period of 5.3 hours while heating and stirring at 103° to 120°C. at a constant pressure of 5 p.s.i.g. The HBr, perchloroethylene, water mixture was then stripped off under vacuum to 118°C. at 15 mm. Hg. The product was a soft tan colored material weighing 738 g. which did not change color upon addition of epichlorohydrin. 8.6 moles (out of a total of 11.2 moles) of HBr were recovered. G.L.C. analysis of the product showed very little reaction, giving:

pentaerythritol — 39.8%
mono-brom — 58.0%
di-brom — 8.2%

We claim:

1. A process for preparing mixtures of brominated pentaerythritols and brominated neopentyl esters, comprising contacting pentaerythritol with HBr and from about 0.2 mole percent to about 50 mole percent, based on pentaerythritol charged, of an acid selected from the group consisting of aliphatic saturated dicarboxylic acids or their anhydrides, free of any substitutents except halogen, having from 3 to 10 carbon atoms in their molecule and aliphatic monoethylenically unsaturated dicarboxylic acids selected from the group consisting of maleic, fumaric, itaconic, citraconic, their anhydrides and halogenated derivatives, at a temperature of from about 85° to about 140°C., in the liquid phase and in an inert solvent, the product mix being determined by the amounts of HBr and dicarboxylic acid used.

2. The process of claim 1 wherein the acid is adipic acid.

3. The process of claim 1 wherein the concentration of the acid is from about 1 to about 7 mole percent.

4. The process of claim 1 wherein the inert solvent is water, perchloroethylene or a mixture thereof.

5. The process of claim 1 wherein the temperature is from about 90° to about 130°C.

6. The process of claim 1 wherein the reaction is conducted at pressures from about atmospheric to about 75 p.s.i.g.

7. The process of claim 1 wherein the pentaerythritol is contacted with from about 0.2 to about 10 mole percent of the dicarboxylic acid and wherein the predominant product obtained is dibromoneopentyl glycol or tribromoneopentyl alcohol.

8. The process of claim 1 wherein the pentaerythritol is contacted with from about 25 to about 50 mole percent of the dicarboxylic acid and wherein the predominant product obtained is a bis(tribromoneopentyl) or a bis(dibromoneopentyl) ester.

9. The process of claim 1 wherein the dicarboxylic acid is malonic, succinic, glutaric, adipic, suberic, sebacic, or maleic.

* * * * *